(12) United States Patent
Hirsch et al.

(10) Patent No.: US 6,220,312 B1
(45) Date of Patent: Apr. 24, 2001

(54) APPARATUS AND METHOD FOR CONTAINER FILLING

(75) Inventors: Robert Sandor Hirsch; Michael M. Chen, both of Troy, NY (US)

(73) Assignee: Shandor Motion Systems, Troy, NY (US)

( * ) Notice: Subject to any disclaimer, the term of this patent is extended or adjusted under 35 U.S.C. 154(b) by 0 days.

(21) Appl. No.: 09/401,052

(22) Filed: Sep. 22, 1999

Related U.S. Application Data
(60) Provisional application No. 60/108,954, filed on Nov. 18, 1998.

(51) Int. Cl.⁷ ....................................................... B65B 1/04
(52) U.S. Cl. ................................................ 141/83; 177/52
(58) Field of Search ..................... 141/83, 1, 18, 141/2; 177/52, DIG. 6, 60

(56) References Cited

U.S. PATENT DOCUMENTS

| | | |
|---|---|---|
| 2,351,606 | 6/1944 | Gold et al. . |
| 2,626,121 | 1/1953 | Sachse . |
| 2,650,057 | 8/1953 | Goland et al. . |
| 3,238,978 | 3/1966 | Frenne . |
| 3,990,212 | * 11/1976 | Flodin ..................................... 141/83 |
| 4,407,379 | * 10/1983 | Pryor et al. ............................ 177/52 |
| 4,484,480 | * 11/1984 | Mucheyer . |
| 4,582,152 | 4/1986 | Gibbons . |
| 5,244,020 | 9/1993 | Bruno et al. . |
| 5,647,411 | 7/1997 | Koppe et al. . |

* cited by examiner

Primary Examiner—Steven O. Douglas
(74) Attorney, Agent, or Firm—Schmeiser, Olsen & Watts

(57) ABSTRACT

A container filling apparatus for dispensing, weighing and automatically filling a container with a predetermined weight of material. The container filling apparatus includes an optical load cell for measuring the weight of an object. A microprocessor controls the dispensing, weighing and automatic filling of the container.

16 Claims, 10 Drawing Sheets

APPARATUS AND METHOD FOR CONTAINER FILLING

This application claims the benefit of Provisional No. 60/108,954 filed Nov. 18, 1998.

FIELD OF THE INVENTION

The present invention relates generally to dispensing devices and methods for metering and dispensing materials into containers and, more particularly, to an apparatus and method for providing automated dispensing of a viscous material such as honey into bottles.

BACKGROUND OF THE INVENTION

It is frequently necessary to automatically dispense a predetermined quantity of material into a container. Scales, balance beams, or electronic load cells are commonly used to measure the weight of the container when empty, and the combined weight of the container and a quantity of material that has been dispensed into the container.

A load cell, including a plurality of strain gauges (e.g., arranged in a full bridge configuration), is often used to provide an electrical signal that is a function of beam. The electrical resistance of the strain gauges changes as the strain gauges are elongated or compressed due to a change in the weight applied to the platform. The changes in resistance are converted by an electronic processing device or other suitable means into a voltage, current, or other signal that is a function of the applied weight. This signal may be entered into a control system that can be programmed to calculate the weight applied to the platform. Unfortunately, strain gauge type load cells are quite costly, difficult to use, and are mechanically fragile. For example, the strain gauges are easily damaged when the platform is overloaded or excessively stressed, necessitating the tedious and expensive process of replacing the strain gauges.

SUMMARY OF THE INVENTION

In order to overcome the above deficiencies, the present invention provides an improved container filling apparatus for dispensing, weighing and automatically filling a container with a predetermined weight of material. The container filling apparatus generally includes an optical load cell for measuring the weight applied to a platform supported by a cantilever beam, a container placed on the platform for receiving and holding a quantity of material, a tank for storing a supply of the material, a solenoid actuated valve for controlling the flow of material from the tank into the container, and a computerized control system for controlling the dispensing and weighing process.

The platform is mounted to an end of a cantilever beam. When weight is applied to the platform, the platform end of the cantilever beam is deflected downward. An infrared light emitter is provided to direct a beam of light onto the surface of the cantilever beam. The intensity of the light reflecting off of the surface of the cantilever beam is measured by a light detector sensor. The light detector sensor provides an output signal that is a function of the weight supported on, or force applied to, the platform. A processor is provided to convert the output signal of the light detector sensor into a weight value.

As the weight supported by the platform increases, the downward deflection of the cantilever beam increases. This deflection reduces the intensity of the light reflecting off of the surface of the cantilever beam and detected by the light detector sensor. The decrease in light intensity is converted by the processor into a weight value.

Unlike strain gauge type load cells, the optical load cell of the present invention is robust in that it is not damaged when a large amount of weight is placed on, and supported by, the platform. Also, the infrared light emitter and light detector sensor are reasonable in cost compared to strain gauges employed by strain gauge type load cells.

For purposes of illustration, the preferred embodiment of the present invention provides a container filling system for dispensing a viscous material, such as honey, into bottles. The apparatus of the present invention, however, may be adapted to dispense and weigh other viscous materials and fluids such as ice cream, peanut butter, jams, oil and paint. Also, the apparatus of the present invention is not limited to fluids, but may be used to dispense and weigh solid materials such as sand, sugar, etc.

A solenoid actuated valve is used to control the flow of material from a storage tank into a container. In the present invention, the solenoid actuated valve includes a large area inlet port, a large area valve, and a large area outlet port in order to allow the viscous honey to rapidly flow into the container. Preferably, the opening and closing of the solenoid actuated valve is controlled by a microprocessor or other programmable system. However, the solenoid actuated valve may also be operated manually, e.g., by manually pressing an on/off switch or the like.

The microprocessor is additionally used, for example, to process the light intensity data received from the optical load cell, to control the solenoid operated valve to stop the flow of material into the container when the container is filled to a predetermined level, and to control the calibration of the container filling apparatus. Further, the microprocessor is configured to receive control inputs from an operator, and to provide output data to the operator.

In the present invention, a first test container is filled to a desired level, and data corresponding to this predetermined level is stored by the microprocessor. After the predetermined level is established, the microprocessor controls the filling process until each successive container to be filled is automatically filled to the predetermined level. Thus, the present invention provides for the rapid and accurate filling of each successive container.

Therefore, in a first embodiment of the present invention, a container filler apparatus is provided. The apparatus comprises:

a platform for supporting an object to be weighed;
a cantilever beam having a fixed end attached to a rigid support and a movable end attached to the platform;
an optical load cell for measuring the deflection of the cantilever beam; and
a control system for using the measured deflection of the cantilever beam to calculate a weight of the object supported by the platform.

The present invention provides a method comprising:
providing a cantilever beam having a platform attached thereto;
applying a light to the beam;
measuring a deflection of the beam using the light; and
using the deflection to automatically fill a container positioned on the platform.

BRIEF DESCRIPTION OF THE DRAWINGS

The features of the present invention will best be understood from a detailed description of the invention and a preferred embodiment thereof selected for the purposes of illustration and shown in the accompanying drawings in which.

Figure 1:
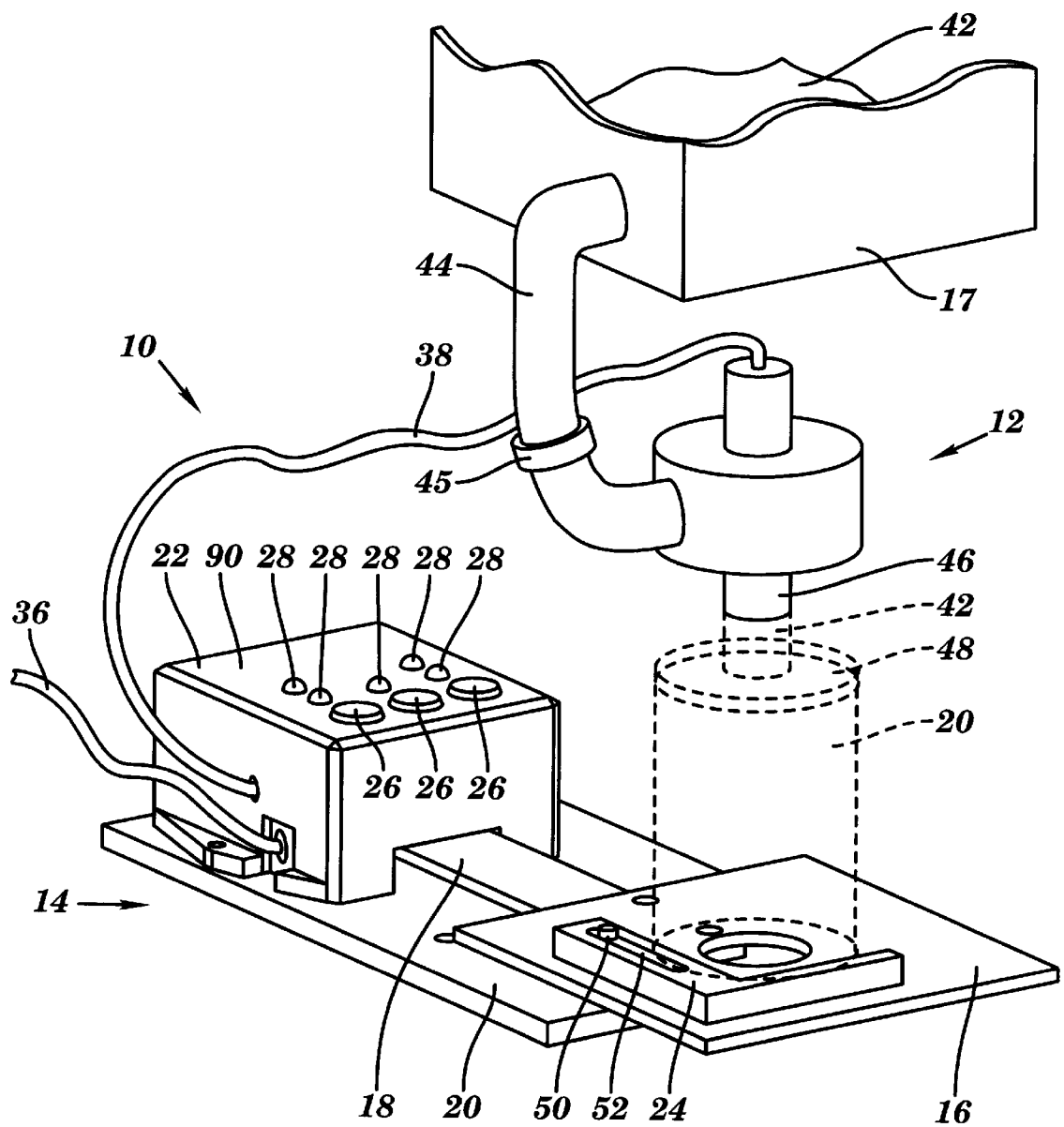
FIG. 1 is a perspective view of the container filling apparatus, according to the present invention.

Although the drawings are intended to illustrate the present invention, the drawings are not necessarily drawn to scale.

DETAILED DESCRIPTION OF THE INVENTION

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. The features and advantages of the present invention are illustrated in detail in the accompanying drawings, wherein like reference numerals refer to like elements throughout the drawings.

Figure 2:
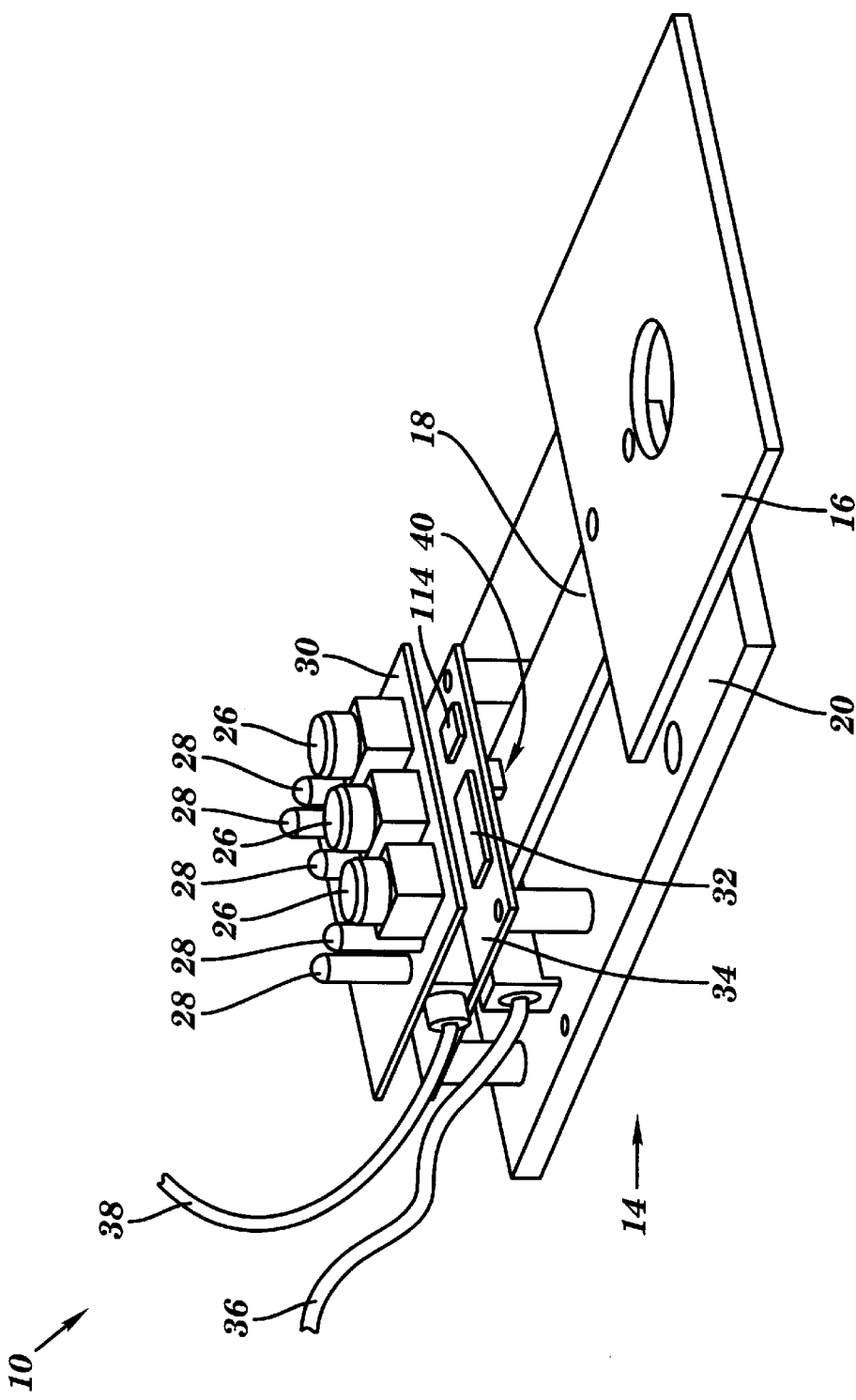
FIG. 2 is a perspective view of the container filling apparatus, according to the present invention, with the control housing removed.

Referring to FIG. 1, there is illustrated a perspective view of a container filling apparatus 10 of the present invention. The container filling apparatus 10 includes a solenoid actuated valve 12, a weighing system 14, a tank 17, and a container 20 (shown in phantom). The weighing system 14 includes a platform 16, a cantilever beam referred to as a "beam" 18, a base 20, and a locating assembly 24. Also included in the weighing system 14 is an optical load cell 40 as shown in FIG. 2. Control buttons 26 and indicator lights 28 protrude through the keypad 90 portion of the housing 22 and are electrically connected to the microprocessor 32. FIG. 2 illustrates the container filling apparatus 10, with the housing 22 removed. Control buttons 26 and indicator lights 28 are mounted on circuit board 30, and the microprocessor 32 is mounted on the circuit board 34. Power cable 36 supplies electrical power to the container filling apparatus 10, and cable 38 supplies electrical control signals from the microprocessor 32 to the solenoid actuated valve assembly 12.

Referring back to FIG. 1, material 42 to be dispensed is stored in the tank 17. Conduit 44 transfers material 42 to the solenoid actuated valve 12. Material 42 can be a highly viscous fluid such as honey, however the material can also be other types of solid and liquid materials, such as ice cream, peanut butter, jams, oil, paint, sand, sugar, etc. A flow regulator 45 may be inserted into the conduit 44. The solenoid actuated valve 12 controls the flow of material 42, and when allowed, the material flows through the solenoid outlet 46. The solenoid outlet 46 can terminate above the opening 48, of the container 20, or the solenoid outlet 46 can extend through the opening 48 of the container. When allowed, material 42 flows from the solenoid actuated valve 12 to the container 20. Locating assembly 24 is slidably attached to the platform 16, by fastener 50. Fastener 50 is received in a slot 52 of the locating assembly 24, and fastener 50 can be tightened or loosened to allow the locating assembly 24 to be slidably positioned and fixed in a given location on platform 16. Since the location of the container 20 relative to the platform 16 will affect the beam 18 deflection, which in turn affects the weight reading, it is imperative that each successive container 20 is placed at the same location on the platform 16. Thus each container 20 that is placed on the platform 16, is placed so that the container 20 contacts the locating assembly 24 in the same manner each time.

Figure 3:
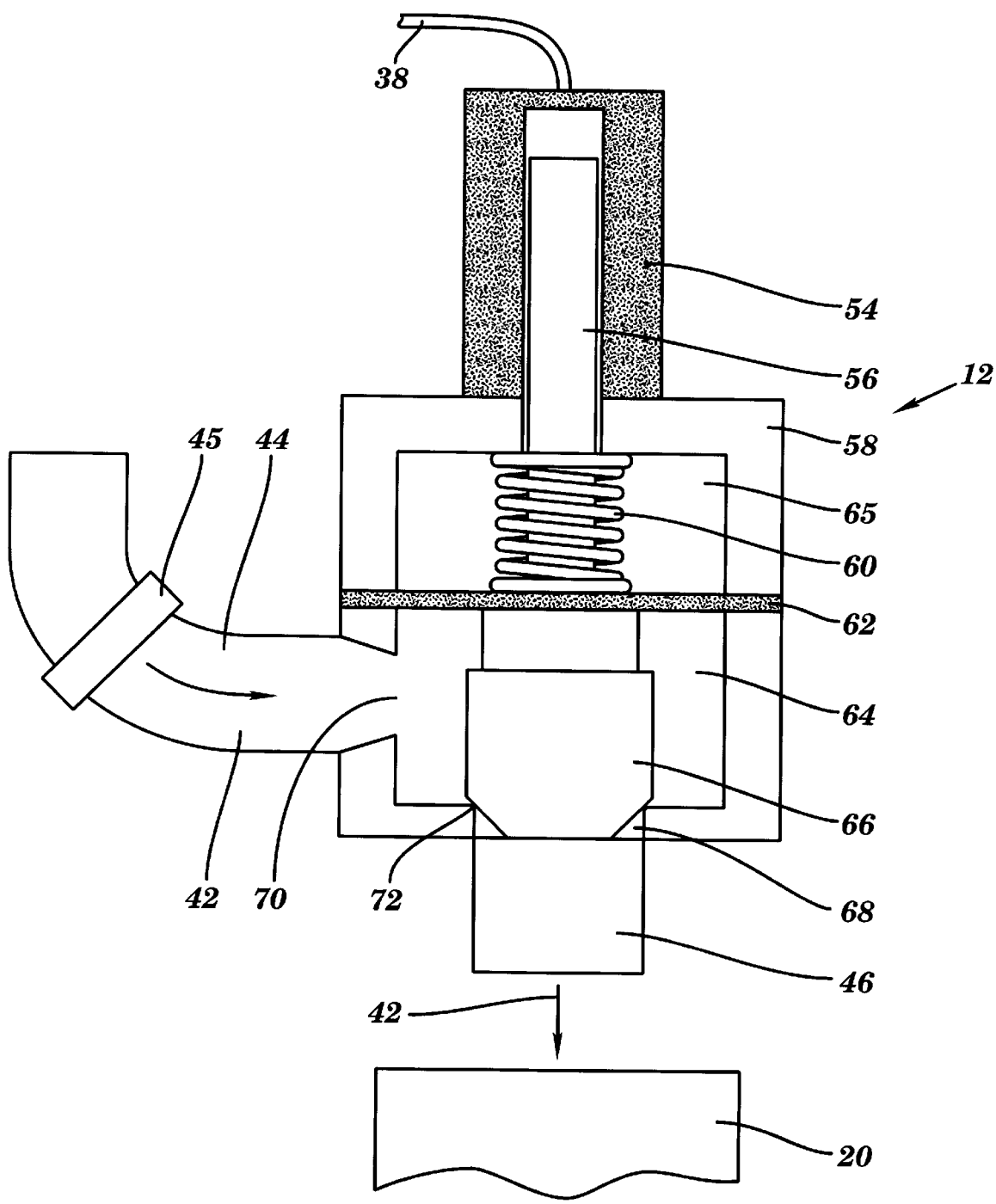
FIG. 3 is a cross-sectional view of the solenoid actuated valve, according to the present invention.

FIG. 3 is a cross-sectional view of the solenoid actuated valve 12. The solenoid actuated valve 12, includes a solenoid 54, a plunger 56, a valve housing 58, a spring 60, a flexible membrane 62, a material cavity 64, a valve 66, a valve seat 72, a valve outlet opening 68, and an inlet port 70. Conduit 44, conducts material 42 from the tank 17 to the valve inlet port 70. The flow regulator 45 may be inserted in the conduit 44, to restrict the material 42 flow rate to the solenoid actuated valve 12. This flow regulator 45 may be necessary when a low flow rate is necessary when filling a small bottle 20, where a high flow rate may cause the small bottle 20 to overflow. The flexible membrane 62 prevents material 42 from entering the upper chamber 65 where the spring 60 is located. Control signals are sent through cable 38 to the solenoid 54. When solenoid 54 is actuated, the plunger 56 attached to the valve 66, is moved toward the solenoid 54, causing the valve 66 to move away from the valve seat 72, allowing material 42 to flow through the conduit 44, through the inlet port 70, through the material cavity 64, and out through the valve outlet opening 68. The valve outlet opening can lead to a solenoid outlet 46, directing material 42 towards a container 20. When the control signals through cable 38 deactivate the solenoid 54, the spring 60 causes the plunger 56 to move the valve 66 onto the valve seat 72, thereby stopping the flow of material 42, through the valve outlet opening 68. In the present invention for dispensing a viscous honey material 42, the inlet port 70 the valve 66, the valve seat 72 and the valve outlet opening 68 must be of sufficiently large area to allow the honey to flow through the solenoid actuated valve 12 at high flow rates to minimize the time required to fill the container 20.

Figure 4:
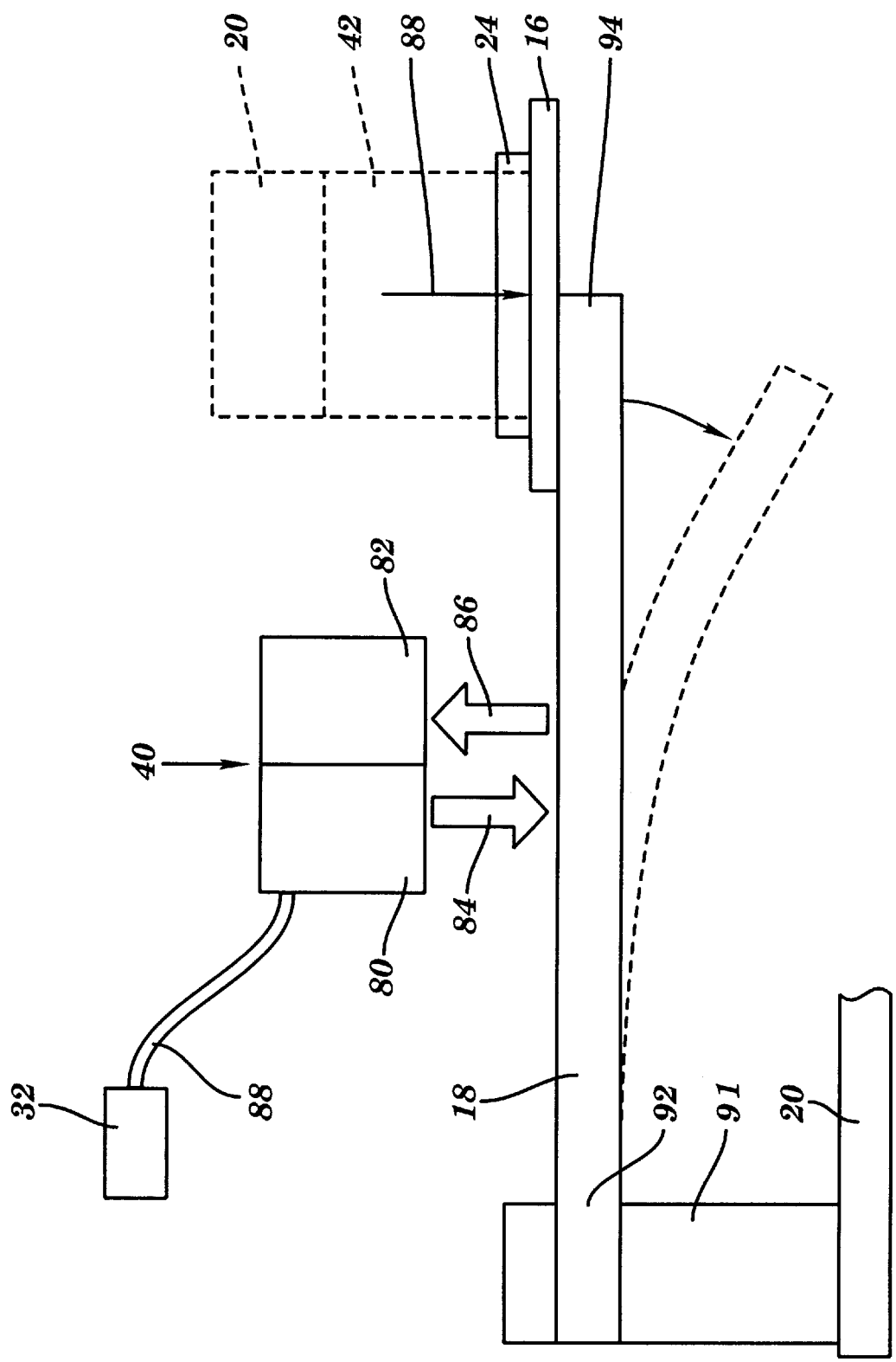
FIG. 4 is a side perspective view of the optical load cell in relationship to the beam.

FIG. 4 is a side perspective view of the optical load cell 40 in relationship to the beam 18. The optical load cell 40 includes a light emitter 80, and a reflected light detector 82. The light emitter 80 directs a beam of light 84, such as but not limited to infrared light, toward the beam 18. Then reflected light 86 is transmitted to the reflected light detector 82, and the reflected light detector 82 provides an output that is transmitted through the cable 88 to the microprocessor 32. Beam 18 is rigidly attached to the beam mounting support 91, and the beam mounting support 91 is rigidly attached to the base 20. Therefore, beam 18 has a fixed end 92 and a movable end 94. When the container 20 or container 20 holding material 42, is placed on the platform 16, a force 88 is applied to the movable end 94 of the beam 18, causing the movable end 94 of the beam 18 to move in a downward direction. As the beam 18 deflects in a downward direction (shown in phantom), the distance between the beam 18 and the optical load cell 40 increases, thereby causing the reflected light 86 intensity to decrease.

Figure 5:
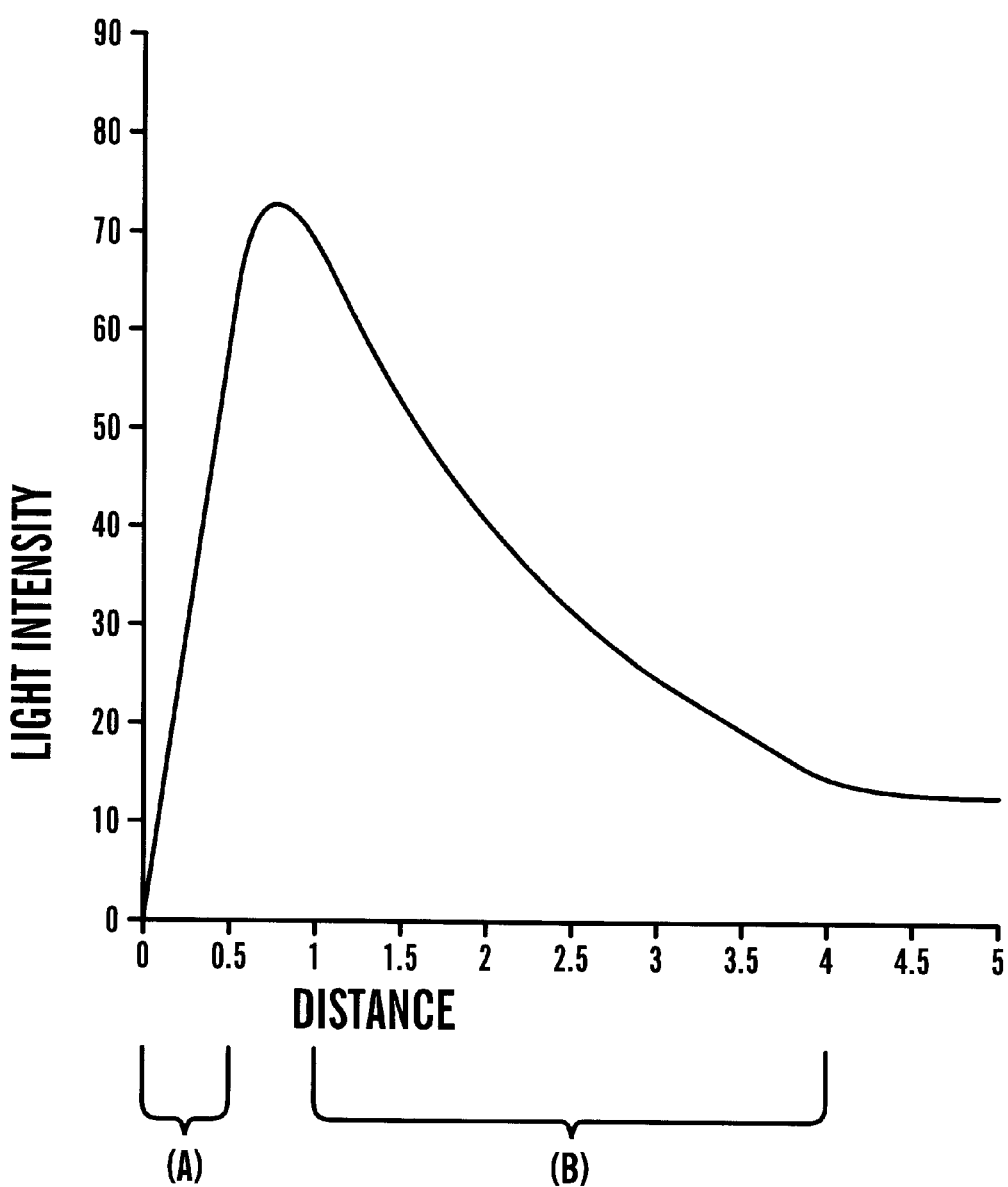
FIG. 5 is a graph of the light intensity versus distance characteristics of the optical load cell, according to the present invention.

A typical calibration curve for the optical load cell 40 according to the present invention is show on FIG. 5, which depicts a graph of the light intensity versus distance (e.g. milimeters). The light intensity on the graph is expressed as an output current (e.g. microamps) from the optical load cell 40. Range (A) or range (B) data points can be stored in the microprocessor 32, so that for a given light intensity, the distance can be calculated. The output from the optical load cell can be but is not limited to an electrical current, or voltage. Range (A) is called the linear range, and range (B) is called the non-linear range. Since the beam 18 deflection distance is a function of the load or weight applied to the end of the beam 94, the microprocessor 32 can calculate the weight of a container 20 or any other type of mass, placed on the end of the beam 94. In order to provide higher weight measuring resolution, a plurality of weight ranges can be generated by using an amplification or gain factor applied to the output signal of the optical load cell 40. This load or weight placed on the end of the beam 18, can include but is not limited to the weight of an empty container 20 or of a container holding various amounts of material 42 including the weight of a container filled with material 42 to a preselected level.

Figure 6:
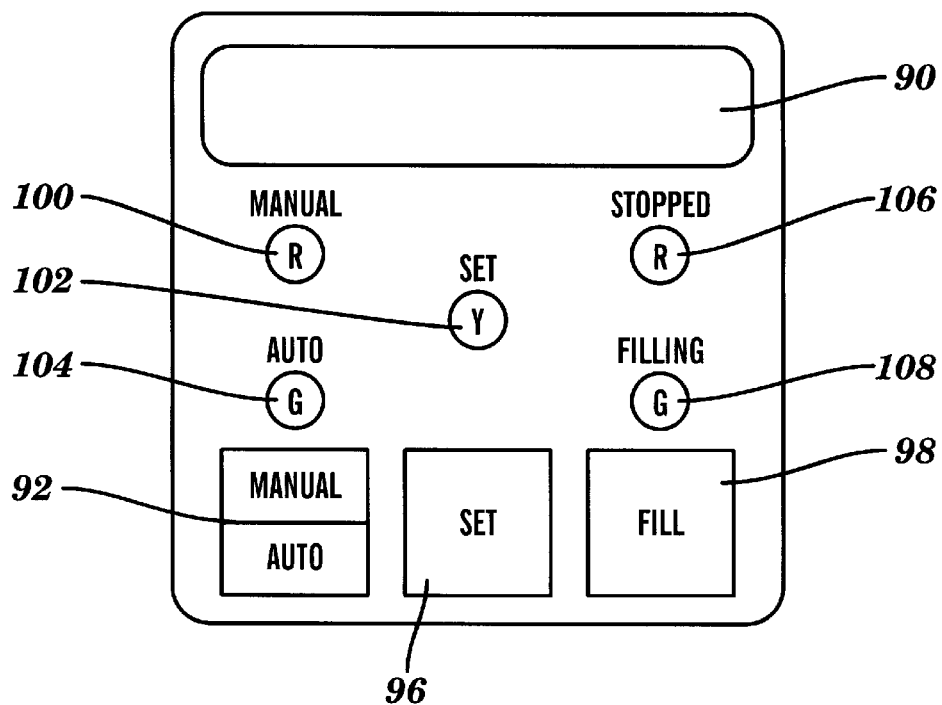
FIG. 6 is a perspective view of the keypad with buttons and lights according to the present invention.

FIG. 6 is a perspective view of the keypad 90 including a mode button 92, a set button 96, a fill button 98, a manual light 100, a set light 102, an auto light 104, a stopped light 106, and a filling light 108. The buttons are not limited to, but can include membrane type or conventional push buttons. The lights can be of different colors to help the operator distinguish various functions. For example, the set light 102 can be yellow, and the manual light 100 and the stopped light 106 can be red. Pressing the mode button 92, will place the container filling apparatus 10 into a manual or automatic mode. In addition to the keypad 90 an auditory system 114 generating a noise such as a beep or buzz is included in the weighing system (FIG. 2).

Figure 7:
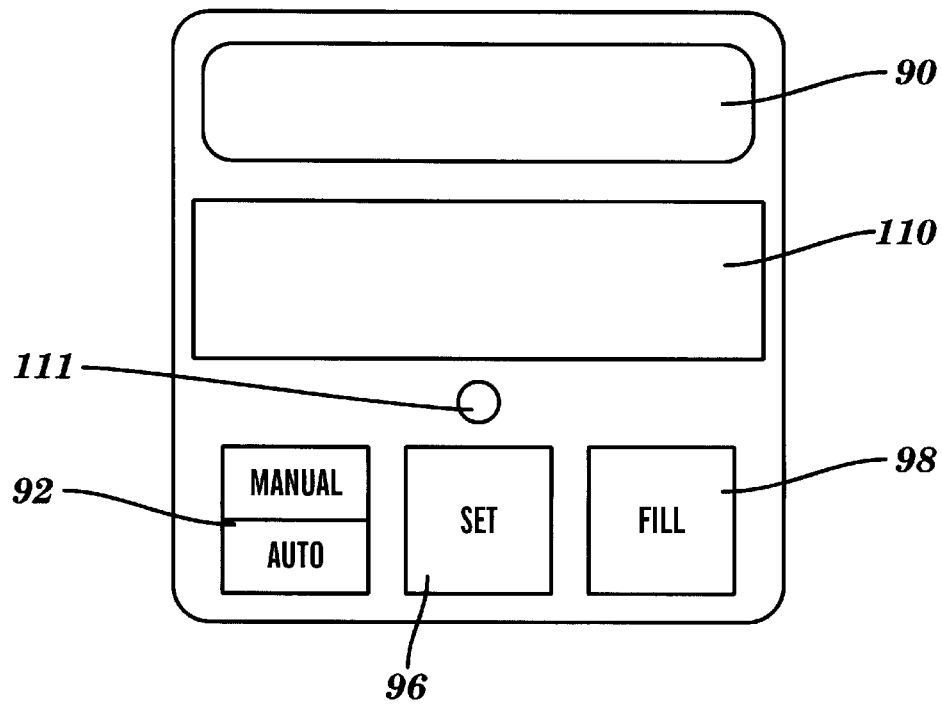
FIG. 7 is a perspective view of another embodiment of the keypad with a liquid crystal display screen, according to the present invention.

FIG. 7 is a perspective view of another embodiment of the present invention where the keypad 90 includes the mode button 92, the set button 96, the fill button 98 and a display screen 110. Pressing the mode button 92 will place the container filling apparatus 10 into a manual or automatic mode. The display screen 110 can be a liquid crystal display screen, but of course other types of display screens other than the liquid crystal display can be used. The display screen 110 is used to display the current status of the mode and of the solenoid actuated valve 12. Operator information is printed on the display screen 110, including displaying an instruction such as "place the empty container on the beam", and including displaying the actual current weight of the container 20. A "units" button 111 can be used by the operator to select different units of measure such as ounces or grams. Of course the display is not limited to these examples, but can display any operator instructions including but not limited to warnings, quantity amounts and microprocessor 32 system status. Although specific configurations for the keypad 90 have been described, it should be appreciated that many equivalents exist. For example, the positioning and functions of the buttons may vary.

Refer to FIG. 6, to locate the specific buttons and lights used to implement and to give indications as described in the following sequence of events to operate the current invention.

Setup:
(1) The operator connects the solenoid actuated valve 12 to the tank 17.
(2) The operator connects the solenoid actuated valve 12 to the microprocessor 32 using cable 38.
(3) The operator applies electrical power through the power cable 36 to the container filling apparatus 10. The operator will hear two beeps, and two red lights 28 will light on the keypad 90. Then the operator will hear a low beeping noise and the "manual" 100 light will blink. This indicates that the container filling apparatus 10 needs calibration.

Calibration:
(1) A low beeping noise indicates that the container filling apparatus 10 requires a weight of about one pound to be placed on the platform 16, at which time the low beeping noise will stop.
(2) A higher frequency noise will be produced and the "set" 102 light will start blinking while the container filling apparatus 10 starts calibrating. The calibration cycle may last from about 5 to about 20 minutes for the highest precision.
(3) The calibration cycle may be bypassed by simultaneously pressing the "mode" 92 and the "fill" 98 buttons while applying electrical power to the container filling apparatus 10. An operator may desire this feature if the container filling apparatus is moved to another location with the same ambient temperature. As long as the ambient temperature and lighting conditions are essentially the same, then the calibration cycle may be bypassed upon repowering the container filling apparatus 10.

Filling the containers:
(1) Check that the red "manual" 100 and "stopped" 106 lights are lit.
(2) Place a bottle 20 under the outlet such that liquid 42 will fall directly into the bottle 20.
(3) Tighten down the bottle locator 24 with the fastener 50.
(4) Press the "set" 96 button. The "set" light 102 will come on as the container filling apparatus 10 weighs the container 20. It will make a beep indicating that the operator should now start filling the container 20.
(5) Press and hold the "fill" 98 button. The solenoid will retract and liquid will fall into the bottle 20. The button is released to stop the material 42 flow.
(6) When the liquid in the bottle 20 is at the desired level, press the "set" 96 button. The operator hears one, two or three beeps. These beeps indicate the weight range of the full bottle 20. The "set" light 102 will go out and the operator is then ready to start filling other bottles 20.
(7) Press the "mode" 94 button to place the unit into an Automatic Mode. The green "auto" 104 light should be lit.
(8) Remove the full bottle 20 and place an empty bottle 20 in its place.
(9) Press and release the "fill" 98 button. The solenoid 54 will move open and fluid 42 will flow. The bottle 20 will fill until it reaches the same level as the bottle that the operator programmed in step 6. The operator will hear beeps that indicate the progression of fluid filling the bottle (ie. ½ full, ¾ full, and ⅞ full).
(10) If it looks like the container will overfill, the operator may press any button to escape the filling cycle.
(11) If the filling stops early press the "fill" 98 button while in auto mode, and a small volume of liquid 42 will be released, or go to a "manual" mode and fill the bottle manually.

(12) In addition to pressing the "fill" 98 button, the operator may also place a bottle 20 on the platform 16 and may press down on the bottle 20. The operator will then hear a beep telling the operator that the dispenser filling apparatus is ready for dispensing. When the operator releases pressure on the bottle 20, the dispenser filling apparatus 10 starts dispensing.

Figure 8:
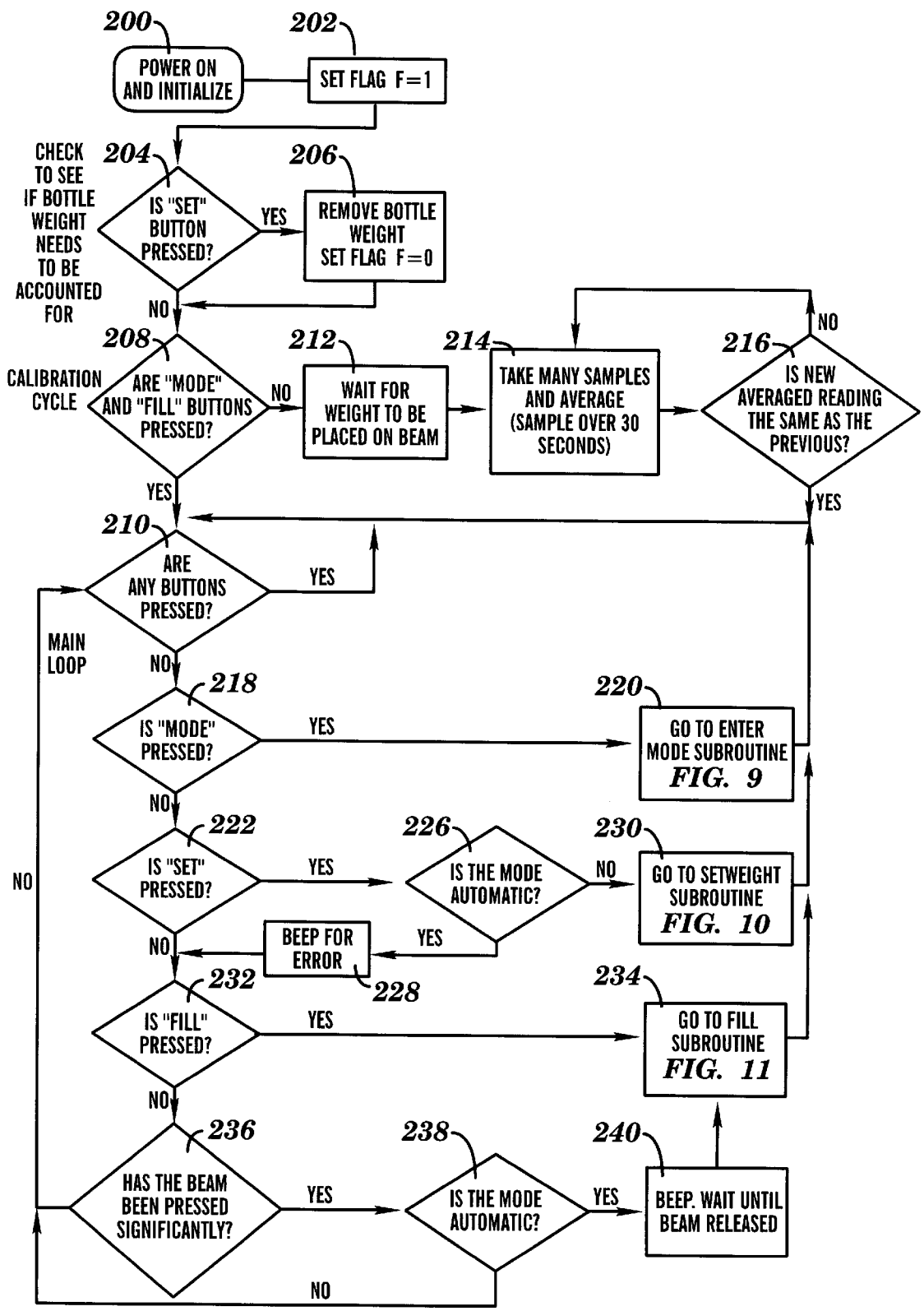
FIG. 8 is a flow diagram for the "power on and initialize" program of the microprocessor, according to the present invention.

FIG. 8 is a flow diagram for the "power on and initialize" program of the microprocessor 32. Push buttons on the keypad 90 are shown in FIG. 6. The program starts on step 200 where power is supplied to the container filling apparatus 10 and a control flag F is set to the value 1 in step 202. In the next step 204, a check determines if the "set" 96 button has been pressed. If the "set" 96 button is pressed, then the program continues to step 206 where the flag F is set to the value 0 and then the program continues to step 208. From step 204, if the "set" 96 button is not pressed then the program continues to step 208. In step 208 if the "mode" 92 button and the "fill" 98 button are pressed, then the program continues to step 210, and if the "mode" 92 button and the "fill" 98 button are not pressed then the program continues to step 212. In step 212, the program waits for weight to be placed on the beam (approximately 1 pound of weight) and then the program continues to step 214. In step 214, samples are taken and averaged over 30 seconds and then the program continues to step 216. In step 216, the program checks to see if the new averaged reading has the same value as the previous averaged reading, and if the answer is yes, then the program continues to step 210, and if the answer is no, then the program continues to step 214. In step 210, there is a check to see if any buttons are pressed, and if any buttons are pressed, the step 210 is repeated. If in step 210 there are no buttons pressed, the program continues to step 218. In step 218 if the "mode" 92 button is pressed then the program continues to step 220, and if the "mode" 92 button is not pressed then the program continues to step 222. In step 220, the program goes to an "enter mode" subroutine 300 shown in FIG. 9. In step 222, if the "set" 96 button is pressed, the program continues to step 226 and if the "set" 96 button is not pressed, the program continues to step 232. In step 226, if the mode is set for the automatic mode then the program goes to step 228, and if the mode is set for manual, then the program goes to step 230. In step 230, the program goes to the set weight subroutine 400 shown in FIG. 10. In step 228 the auditory system 144 sounds a beep to indicate an error. From step 228, the program continues to step 232. In step 232, if the "fill" 98 button is pressed, the program goes to step 234, and if the "fill" 98 button is not pressed, then the program goes to step 236. In step 234, the program goes to the "fill subroutine" shown in FIG. 11. In step 236, the program checks to see if the beam has been pressed significantly (by a weight of about 1 pound), and if this is correct, then the program goes to step 238, and if this is not correct then the program goes to step 210. In step 238, the program checks to see if the mode is automatic, and if it is in automatic, then the program goes to step 240, and if this is not true, then the program goes to step 210. In step 240, the auditory system 114 beeps and the program continues to step 234 only after the weight on the beam has been removed.

Figure 9:
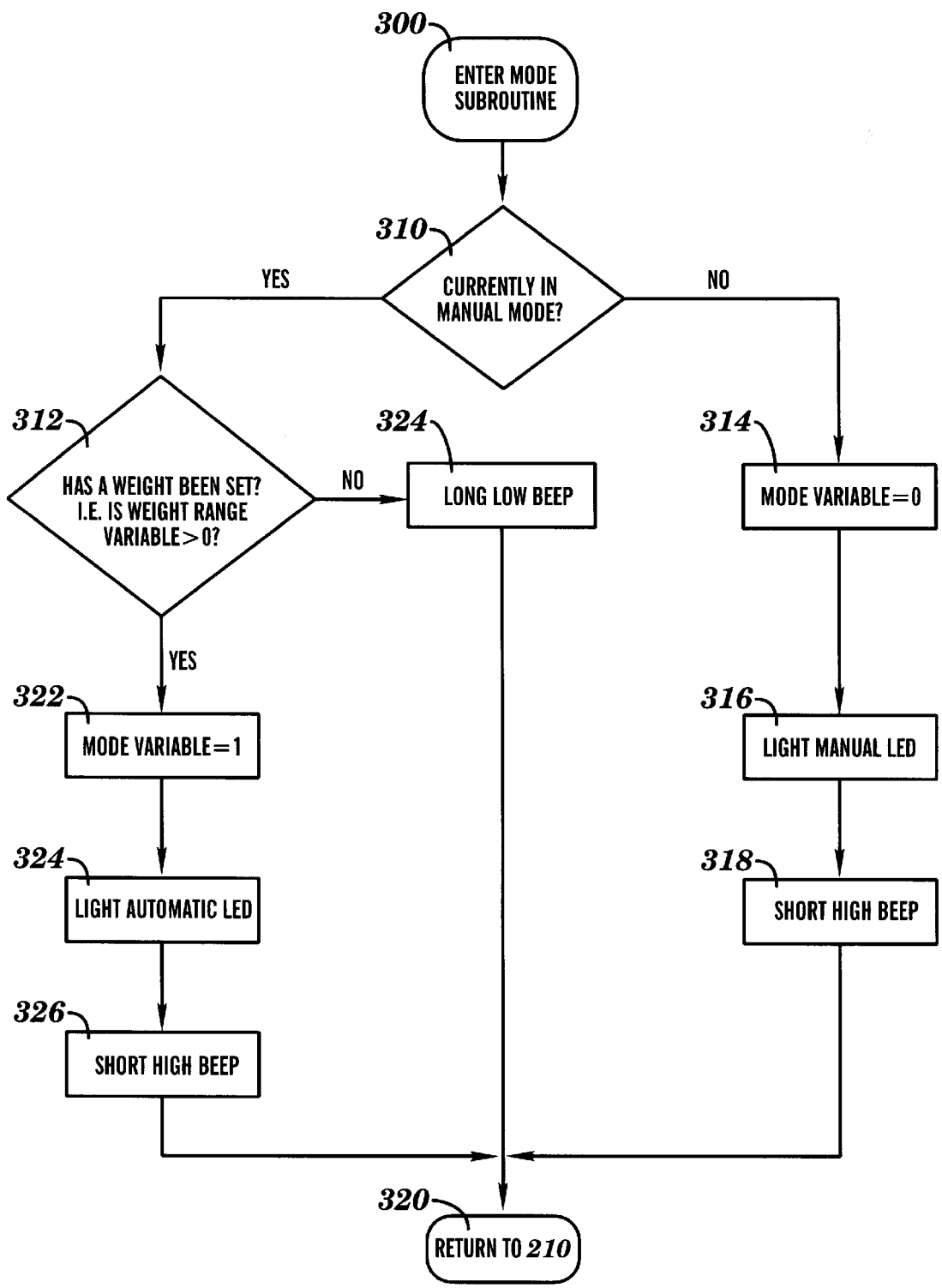
FIG. 9 is a flow diagram for the "mode subroutine" program of the microprocessor, according to the present invention.

In FIG. 9 is shown the "enter mode" subroutine that starts with step 300. From step 300 the program continues on to step 310. Step 310 checks to see if the container filling apparatus 10 is in a manual mode and if it is then the program continues to step 312 and if it is not then the program continues to step 314. In step 314 the mode variable is set to 0 and the program continues to step 316. In step 316 the "manual" light 100 is turned on, and the program continues to step 318. In step 318, the auditory system 114 sounds a short high frequency beep, and the program continues to step 320. In step 312, a check is made to determine if a weight has been set (ie. Is the weight range variable greater than 0). If the weight range variable is greater than 0, then the program continues to step 322, and if the weight range variable is not greater than 0, then the program continues to step 324. In step 324, the auditory system generates a long low frequency beep to indicate an error, and then the program continues to step 320. In step 322, the mode variable is set to a value of 1 and the program continues to step 324. In step 324, the "automatic" light 104 is lit, and the program continues to step 326. In step 326, the auditory system 114 generates a short high frequency beep, and the program continues to step 320. In step 320, the program continues to step 210 on FIG. 8.

Figure 10:
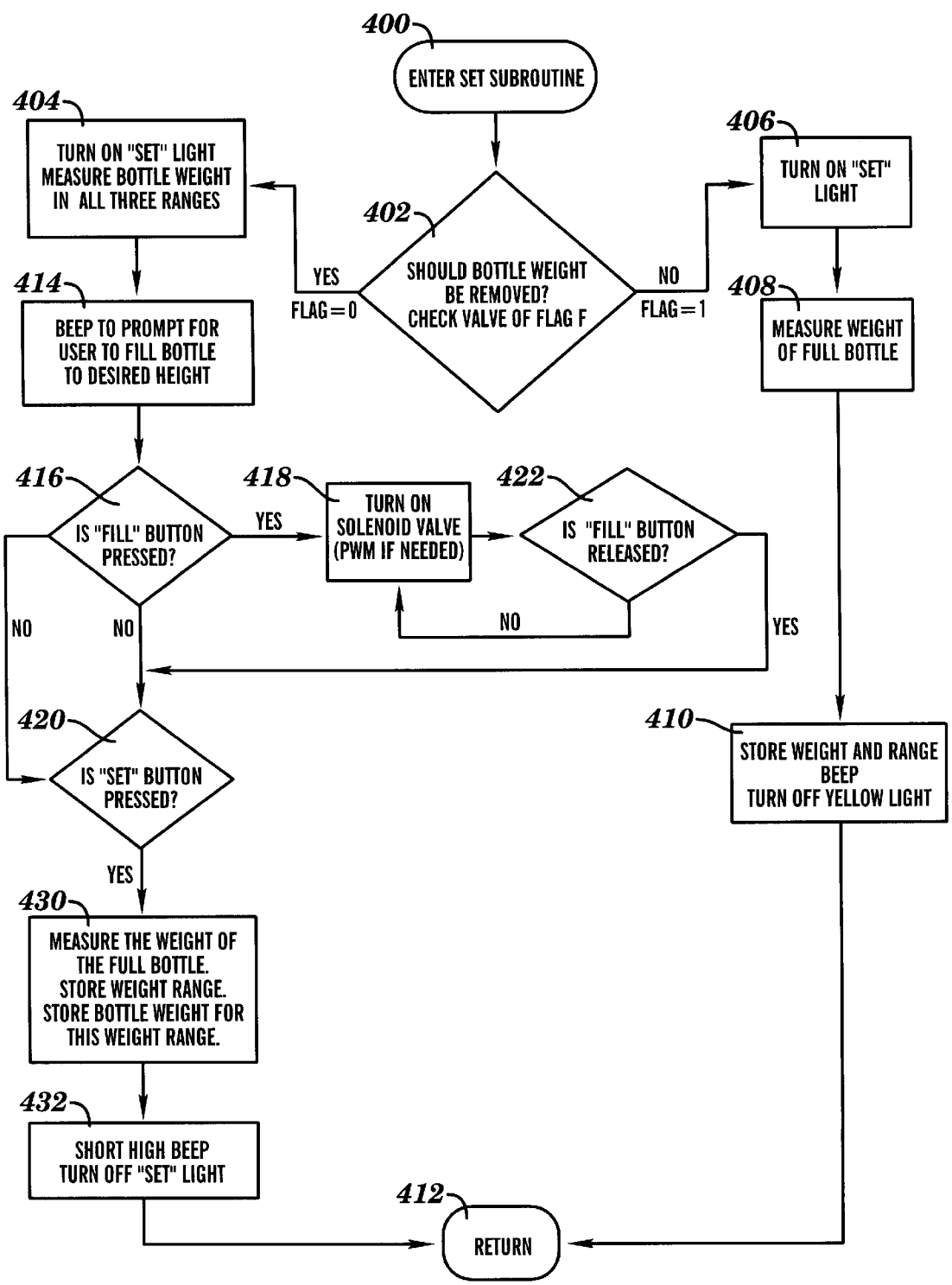
FIG. 10 is a flow diagram for the "set subroutine" program of the microprocessor, according to the present invention.

In FIG. 10, the "enter set" subroutine is shown starting in step 400. From step 400 the program continues to step 402. In step 402, a check is made to determine is the bottle weight should be removed. The value of the Flag F is checked. If the value of the Flag F is 0 then the program goes to step 404 and if the value of the Flag F is 1 then the program goes to step 406. In step 406, the "set" light 102 is turned on and the program continues to step 408. In step 408, the weight of a bottle filled with material is measured and the program continues to step 410. In step 410, the value of the weight of the container 20 and the weight range signal from the optical load cell 40 is stored, and the auditory system 114 sounds a beep, and the "set" 102 light is turned off, and the program continues to step 412. In step 404, the "set" 102 light is turned on, and the bottle weight is measured in all three ranges of the optical load cell 40, and the program continues to step 414. In step 414, the auditory system 114 beeps to prompt the operator to fill the bottle 20 with material 42 to a desired fill amount, and then the program continues to step 416. In step 416 a check is made to see if the "fill" 98 button is pressed and if the "fill" 98 button is pressed, the program goes to step 418, and if the "fill" 98 button is not pressed, the program goes to step 420. In step 418 the solenoid 54 is energized causing the solenoid actuated valve 12 to allow material 42 to flow into the bottle 20. In the present invention, normally full electrical power is at first applied to the solenoid actuated valve 12, followed by a pulse width modulated power to prevent the solenoid 54 from failing due to overheating. From step 418, the program continues to step 422. In step 422, if the "fill" 98 button is released, then the program goes to step 416, and if the "fill" 98 button is not released, then the program goes to step 418. In step 420, if the "set" 96 button is pressed, then the program continues on step 430, and if the "set" 96 button is not pressed, then the program continues on step 416. In step 430, the weight of the bottle 20 filled with material 42 is measured and stored and the weight range of the signal from the optical load cell 40 is stored. From step 430, the program continues to step 432. In step 432, the auditory system 114 sounds a short high frequency beep and the "set" 102 light is turned off. From step 432 the program continues to step 412. From step 412 the program continues to step 210 of FIG. 8.

Figure 11:
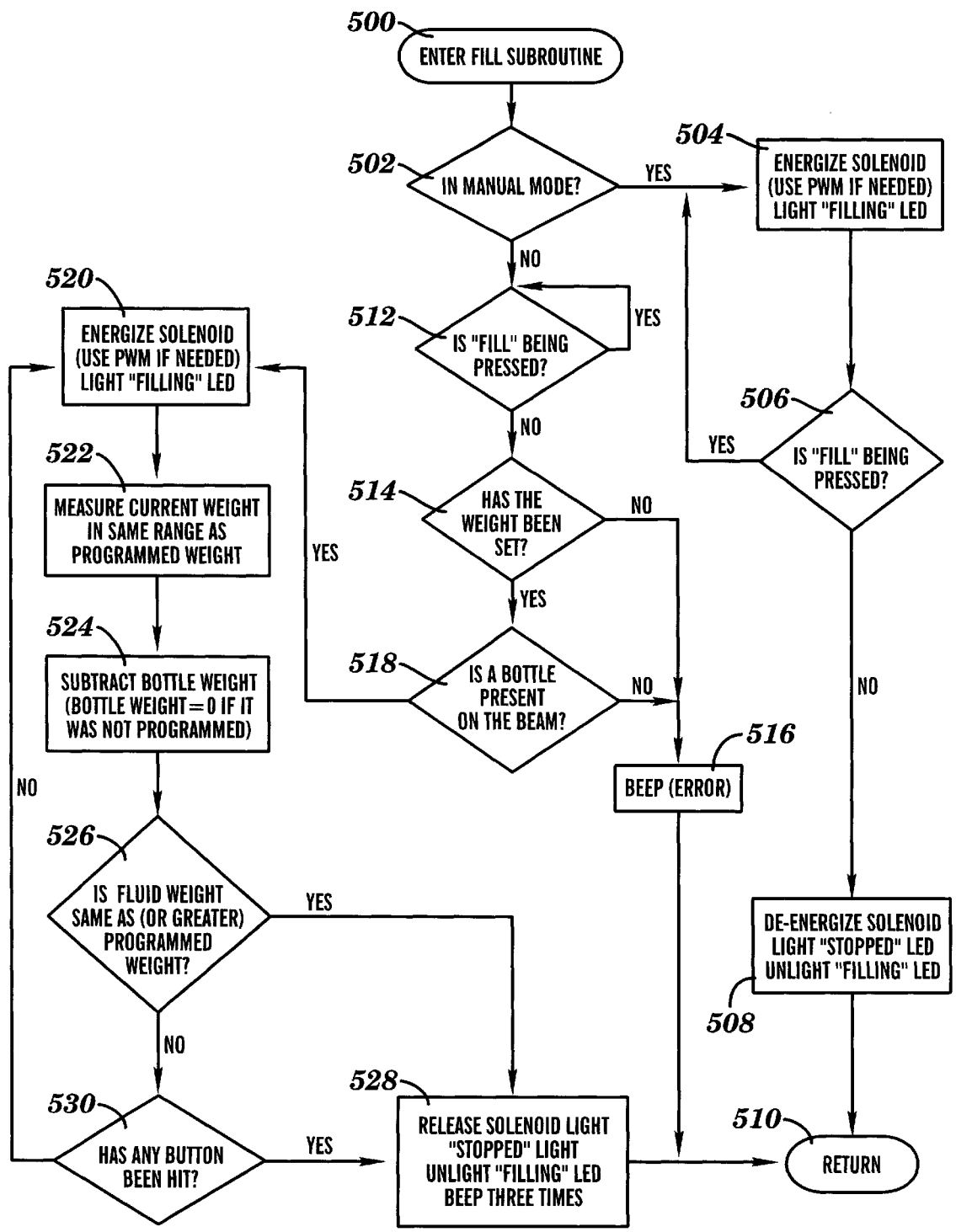
FIG. 11 is a flow diagram for the "fill subroutine" program of the microprocessor, according to the present invention.

In FIG. 11, the "enter fill" subroutine starts with step 500 and continues to step 502. In step 502, if the container filling apparatus 10 is in a manual mode, then the program continues to step 504, and if the container filling apparatus 10 is in an automatic mode, then the program continues to step 512. In step 504, the solenoid 54 is actuated causing the solenoid actuated valve 12 to allow material 42 to flow into the bottle 20. In the present invention, full electrical power is at first applied to the solenoid actuated valve 12, normally followed by a pulse width modulated power. Also, in step 504, the "filling" 108 light is turned on, and the program continues in step 506. In step 506, if the "fill" 98 button is being pressed, then the program goes to step 504, and if the "fill" 98 button is not being pressed, then the program goes to step 508. In step 508, the solenoid 54 is de-energized causing material flow 42 to stop, and the "stopped" 106 light is turned on, and the "filling" 108 light is turned off. From step 508, the computer program continues to step 510. In step 512, if the "fill" 98 button is being pressed, the program continues to step 512, and if the "fill" 98 button is not being pressed, the program continues to step 514. In step 514, if the weight has been set, then the program goes to step 518. In step 516, the auditory system 114, sounds a beep to signify an error, and then the program continues to step 510. In step 518, if a bottle 20 is present on the beam 18, then the program goes to step 520, and if the there is no bottle 20 present on the beam 18, then the program goes to step 516. In step 520, the solenoid 54 is energized causing the solenoid actuated valve 12 to allow material 42 to flow into the bottle 20. In the present invention, full electrical power is at first applied to the solenoid actuated valve 12, followed by a pulse width modulated power to prevent the solenoid 54 from failing due to overheating. From step 520 the program continues to step 522. In step 522 the current weight of the container 20 is measured and stored using the same optical load cell 40 signal range as with the programmed weight. From step 522, the program continues to step 524. In step 524, the bottle weight is subtracted from the current weight determined in step 522. The bottle weight is 0 if the flag F=0 in step 206 in FIG. 8. From step 524, the program continues to step 526. In step 526, if the material 42 fluid weight is the same as or greater than the programmed weight then the program goes to step 528, however if the material 42 fluid weight is less than the programmed weight then the program goes to step 530. In step 530, if any button has been pressed, then the program goes to step 528, and if no button has been pressed, then the program goes to step 520. In step 528, the solenoid 54 is de-energized causing the solenoid actuated valve to stop material 42 from flowing to the bottle 20, also the "stopped" 106 light is turned on, and the "filling" 108 light is turned off and the auditory system beeps three times. From step 528 the program goes to step 510. From step 510, the program goes to step 210 in FIG. 8.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

We claim:

1. A container filling apparatus comprising:
   a platform for supporting an object to be weighed;
   a cantilever beam having a fixed end attached to a rigid support and a movable end attached to the platform, wherein the cantilever beam includes a surface located between the fixed end and the movable end;
   an optical load cell for measuring the deflection of the cantilever beam, wherein the optical load cell includes a light emitter projecting a light beam onto the surface of the cantilever beam and a reflected light detector receiving a reflected light from the surface of the cantilever beam; and
   a control system for using the measured deflection of the cantilever beam to calculate a weight of the object supported by the platform.

2. The container filling apparatus according to claim 1, wherein the object is a container placed on the platform.

3. The container filling apparatus according to claim 2, wherein the container is a bottle.

4. The container filling apparatus according to claim 1, further including a tank for storing a material.

5. The container filling apparatus according to claim 4, further including a valve to control the flow of the material from the tank to the container.

6. The container filling apparatus according to claim 5, wherein the control system controls the operation of the valve.

7. The container filling apparatus according to claim 5, wherein the control system controls the valve to provide a predetermined amount of the material.

8. The container filling apparatus according to claim 1, wherein the light emitter projects the light beam onto the surface of the cantilever beam in a direction substantially perpendicular to the surface of the cantilever beam and the reflected light detector receives a reflected light from the surface of the cantilever beam in a direction substantially perpendicular to the surface of the cantilever beam.

9. The container filling apparatus according to claim 1, wherein the control system includes at least one button for input control and at least one indicator light for providing visual indication of the control system status.

10. The container filling apparatus according to claim 1, wherein the control system includes a sound generator for providing an aural indication.

11. The container filling apparatus according to claim 1, wherein the control system includes a display screen for providing visual information.

12. A method for filling a container, the method comprising:
   providing a platform for supporting an object to be weighed;
   providing a cantilever beam having a fixed end attached to a rigid support and a movable end attached to the platform, wherein the cantilever beam includes a surface located between the fixed end and the movable end;
   providing an optical load cell for measuring the deflection of the cantilever beam, wherein the optical load cell includes a light emitter projecting a light beam unto the surface of the cantilever beam and a reflected light detector receiving a reflected light from the surface of the cantilever beam; and
   providing a control system for using the measured deflection of the cantilever beam to calculate a weight of the object supported by the platform.

13. A method comprising:
   providing a cantilever beam having a platform attached thereto and a surface located between a fixed end of the cantilever beam and a moveable end of the cantilever beam;
   applying a light to the surface of the beam;
   measuring a deflection of the surface of the beam using the light; and
   using the deflection to automatically fill a container positioned on the platform.

14. A method for filling a container, the method comprising:
   providing a container for filling;
   providing a filling apparatus having a platform, a cantilever beam having a first end attached to a rigid support and a second end attached to the platform, wherein the cantilever beam includes a surface located between the first end and the second end; an optical load cell for measuring a deflection of the surface of the cantilever beam, wherein the optical load cell includes a light emitter projecting a light beam onto the surface of the cantilever beam and a reflected light detector receiving a reflected light from the surface of the cantilever beam, a control system for using the measured deflection of the surface of the cantilever beam to calculate a weight of the object supported by the platform, a tank for storing a material, and a valve for controlling the flow of the material from the tank to the container.

15. A method for filling a container, comprising:

placing an empty container on a platform attached to a movable end of a cantilever beam;

weighing the empty container using an optical load cell for determining a deflection of the cantilever beam;

filling the container to a predetermined level, wherein the level is determined using the optical load cell;

placing a control system in an automatic mode;

removing the full container;

placing an empty container on the platform;

placing the control system in an automatic fill mode for automatically filling the empty container to the predetermined level; and pressing down and releasing the platform to place the control system in the automatic filling mode.

16. The method of claim 15, further including the step of placing the control system in a manual mode of filling allowing an operator to fill the container manually.

* * * * *